United States Patent
Nam et al.

(10) Patent No.: US 7,534,515 B2
(45) Date of Patent: May 19, 2009

(54) ACID-BASE PROTON CONDUCTING POLYMER BLEND MEMBRANE

(75) Inventors: Kiehyun Nam, Palo Alto, CA (US); Helen Xu, Sunnyvale, CA (US); Shuguang Cao, Mountain View, CA (US); David Olmeijer, San Francisco, CA (US); Jon Servaites, San Francisco, CA (US); Ying Wang, Milpitas, CA (US)

(73) Assignee: Polyfuel, Inc., Mountain View, CA (US)

( * ) Notice: Subject to any disclaimer, the term of this patent is extended or adjusted under 35 U.S.C. 154(b) by 415 days.

(21) Appl. No.: 10/351,257

(22) Filed: Jan. 23, 2003

(65) Prior Publication Data

US 2003/0219640 A1    Nov. 27, 2003

(51) Int. Cl.
*H01M 8/10* (2006.01)
(52) U.S. Cl. .................. 429/33; 429/309; 524/500; 526/243
(58) Field of Classification Search .......... 429/33, 429/309; 524/500; 526/243
See application file for complete search history.

(56) References Cited

U.S. PATENT DOCUMENTS

| | | | |
|---|---|---|---|
| 4,295,952 A | | 10/1981 | De Nora et al. |
| 4,664,761 A | * | 5/1987 | Zupancic et al. ............. 205/637 |
| 5,773,480 A | | 6/1998 | Stone et al. |
| 5,985,942 A | | 11/1999 | Stock et al. |
| 5,989,742 A | | 11/1999 | Cabasso et al. |
| 6,194,474 B1 | | 2/2001 | Kerres et al. |
| 6,248,469 B1 | * | 6/2001 | Formato et al. ............. 429/41 |
| 6,300,381 B1 | * | 10/2001 | Kerres et al. ............. 521/27 |
| 6,444,343 B1 | * | 9/2002 | Prakash et al. ............. 429/33 |
| 6,632,847 B1 | | 10/2003 | Soczka-Guth et al. |

(Continued)

FOREIGN PATENT DOCUMENTS

WO    WO0164322    9/2001

(Continued)

OTHER PUBLICATIONS

An, Sung-Guk et al. "Morphology control of poly(phenylene oxide) by ionomeric poly(styrenesulfonic acid sodium salt) copolymers for fuel cell membrane" *Prepr. Pap.—Am. Chem. Soc. Div. Fuel Chem.* vol. 49(2) pp. 582-583 (2004).

(Continued)

*Primary Examiner*—Peter D. Mulcahy
*Assistant Examiner*—Henry Hu
(74) *Attorney, Agent, or Firm*—Morgan Lewis & Bockius LLP

(57) ABSTRACT

An acid-base proton conducting polymer blend membrane is provided. The acid-base proton conducting polymer blend membrane comprises a first acidic polymer having acidic subunits, a second basic polymer having basic subunits, and a third polymer containing one or more functional units for improving membrane conductivity, flexibility, water remaining ability, dimension stability, and methanol crossover. In one embodiment, the acid-base polymer blend membrane of the present invention comprises a first acidic polymer having acidic subunits, a second basic polymer having basic subunits, wherein at least one of the first acidic and second basic polymer comprises one or more functional units to improve the properties of the membrane. The functional units include hydrophilic units, methanol blocking units, methanol blocking units, dimensional stabilizer units, and flexible units.

16 Claims, 1 Drawing Sheet

U.S. PATENT DOCUMENTS

| | | | |
|---|---|---|---|
| 6,869,980 B2 * | 3/2005 | Cui | 521/27 |
| 6,933,068 B2 | 8/2005 | Asano et al. | |
| 7,052,805 B2 * | 5/2006 | Narang et al. | 429/314 |

FOREIGN PATENT DOCUMENTS

| WO | WO 01/94450 | 12/2001 |
|---|---|---|
| WO | WO02103834 | 12/2002 |

OTHER PUBLICATIONS

Gogel, et al., "Recent Developments in Direct Methanol Fuel Cells", University of Stuttgart, dept. of Chemical Engineering.

Kaur et al., Polymer Electrolyte Membranes: Blends of Sulfonated Polystyrene and Poly(vinyl alcohol-co-ethylene) *Prepr. Pap.—Am. Chem. Soc. Div. Fuel Chem*. vol. 49(2) pp. 603-604 (2004).

Prakash, et al., High Efficiency Direct Methanol Fuel Cell Based on Poly(styrenesolfonic) Acid (PSSA)—Poly(vinylidenefluoride) (PVDF) Composite Membranes, *Abs. 311, 205th Meeting Electrochemical Society*, (2004).

Scanlon, E. "Polybenzimidazole based segmented block copolymers for high temperature fuel cell membranes" *Prepr. Pap.—Am. Chem. Soc. Div. Fuel Chem*. vol. 49(2) pp. 522-523 (2004).

Swier, et al. "Design of Polymer Blends for Proton-Exchange Membranes in Fuel Cells", *Prepr. Pap.—Am. Chem. Soc. Div. Fuel Chem*. vol. 49(2) pp. 532-533 (2004).

Zhang, et al. Synthesis, Characterization and Fuel Cell Performance of Poly (2,2'-(P-Phenylene)-5,5'-Bibenzimidazole) as a High Temperature Fuel Cell Membrane, *Prepr. Pap.—Am. Chem. Soc. Div. Fuel Chem*. vol. 49(2) pp. 588-589 (2004).

* cited by examiner

US 7,534,515 B2

ACID-BASE PROTON CONDUCTING POLYMER BLEND MEMBRANE

FIELD OF THE INVENTION

This invention relates generally to the field of electrochemical devices and particularly to fuel cells. More particularly, this invention relates to acid-base proton conducting polymer blend membranes for polymer electrolyte membrane based fuel cells.

BACKGROUND OF THE INVENTION

Fuel cells have been projected as promising power sources for portable electronic devices, electric vehicles, and other applications due mainly to their non-polluting nature. Of various fuel cell systems, the polymer electrolyte membrane based fuel cell technology such as polymer electrolyte membrane fuel cells (PEMFCs) and direct methanol fuel cells (DMFCs) have attracted much interest thanks to their high power density and high energy conversion efficiency. The "heart" of a polymer electrolyte membrane based fuel cell is the so called "membrane-electrode assembly" (MEA), which comprises a thin, solid proton conducting polymer membrane having a pair of electrode layers (i.e., an anode and a cathode) with dispersed catalysts on the opposing surfaces of the membrane electrolyte.

Proton-conducting membranes for PEMFCs and DMFCs are known, such as Nafion® from the E. I. Dupont De Nemours and Company or analogous products from Dow Chemicals. These perfluorinated hydrocarbon sulfonate ionomer products, however, have serious limitations in the application of high temperature hydrogen/air polymer electrolyte membrane fuel cells (PEMFCs) and direct methanol fuel cells (DMFCs). Nafion® loses conductivity when the operation temperature of the fuel cell is over 80° C. Moreover, Nafion® has a very high methanol crossover rate, which impedes its applications in DMFCs. U.S. Pat. No. 5,773,480 assigned to Ballard Power System describes a partially fluorinated proton conducting membrane from α, β, β-trifluorostyrene. One disadvantage of this membrane is its high cost of manufacturing due to the complex synthetic processes for monomer α, β, β-trifluorostyrene and the poor sulfonation ability of poly (α, β, β-trifluorostyrene). Another disadvantage of this membrane is that it is very brittle, thus has to be incorporated into a supporting matrix.

U.S. Pat. Nos. 6,300,381 and 6,194,474 to Kerres et. al. describe an acid-base binary polymer blend system for proton conducting membranes. While these membranes can reduce methanol crossover and have certain flexibility, they have difficulties in adjusting the membrane mechanical properties due to the limitation of the binary system.

WO 01/94450, which is incorporated by reference herein, describes a proton conducting membrane with a ternary system, in which elastomeric polymers are added to provide high proton conductivity and low methanol permeability.

However, the need for a good membrane in the fuel cell operation requires balancing of various properties of the membrane. For instance, among other properties such as proton conductivity, water retaining ability is very important for high temperature applications, fast start up of DMFCs, and maintaining cell performance. In addition, it is very important for the membrane to retain its dimension stability over temperature. In the case of a DMFC, the methanol crossover and chemical reaction generate enough heat to raise the cell temperature. If the membrane swells significantly, it will cause more methanol crossover, thus a higher cell temperature. The membrane thus gradually loses its ability to block methanol crossover, resulting in degradation of the cell performance. The dimension changes of the membrane also put a stress on the bonding of the membrane-electrode assembly (MEA). Often time this results in delimination of the membrane from the electrode after excessive swelling of the membrane. Therefore, maintaining the dimension stability over temperature and avoiding excessive membrane swelling are important for the DMFC application.

In the prior art, crosslinking agents are often used to covalently link molecular chains together, such as crosslinked sulfonated polystyrene used for water purification. Crosslinking agents, however, often reduce proton conductivity and cause membrane brittleness. Therefore, it is desirable to develop a dimensional stabilizer to provide membrane dimension stability without significant loss of membrane conductivity.

Furthermore, the morphology of most prior art membranes are not maximally optimized to create a membrane structure that can provide high conductivity, low methanol crossover, and good dimension stability and water retaining ability at same time. Block copolymers are more advantageous over random copolymers due to their distinctive domain size and ability to retain most of their own characteristics in a polymer blend system. Block copolymers are also more efficient in adjusting the desired properties of the membrane. Therefore, it is desirable to develop a polymer blend membrane that is optimized with high conductivity, low methanol crossover, good dimensional stability, and good water retaining ability by using multi-component functional groups including block copolymers.

SUMMARY OF THE INVENTION

Accordingly, it is an object of the present invention to provide a proton conducting polymer blend membrane that possesses good water retaining ability, dimensional stability, adhesion/bonding ability, reduced methanol permeability, and mechanical properties by introducing multi functional units.

It is another object of the present invention to provide a proton conducting polymer blend membrane that is maximally optimized with high proton conductivity, low methanol crossover, good water retaining ability, dimensional stability, and adhesion/bonding ability.

It is a further object of the present invention to provide a PEMFC or DMFC that comprises the proton conducting polymer blend membrane of the present invention.

These and other objects are achieved by the acid-base proton conducting polymer blend membrane of the present invention. The acid-base proton conducting polymer blend membrane comprises a first acidic polymer having acidic subunits, a second basic polymer having basic subunits, and a third polymer containing one or more functional units for improving membrane conductivity, flexibility, water remaining ability, dimensional stability, adhesion/bonding ability, and methanol crossover. In one embodiment, the acid-base polymer blend membrane of the present invention comprises a first acidic polymer having acidic subunits, a second basic polymer having basic subunits, wherein at least one of the first acidic and second basic polymer comprises one or more functional units. The functional units used to improve the membrane properties include hydrophilic units, dimensional stabilizer units, methanol blocking units, and flexible units. Flexible units preferably are not elastomeric units. Elastomeric subunits may be added to the acidic, basic or functional unit polymer or copolymers. Elastomeric polymers and copolymers may also be added to the blend of (1) acidic, basic and functional polymer, (2) acidic-functional unit copolymer and basic polymer, or (3) a basic-functional unit copolymer and an acidic polymer.

Suitable hydrophilic polymers include polyvinylpyrrolidone, poly (n-isopropylacrylamide), and poly(2-hydroxyethyl methacrylates) (HEMA). The hydrophilic units can also be copolymerized with other functional groups for adjusting dimensional stability, methanol crossover, and mechanical properties.

Suitable hydrophilic copolymers include copolymers of (vinylpyrrolidone-vinylimidazole), copolymers of (vinylpyrrolidone-dimethylaminoethyl methacrylate), copolymers of (vinylpyrrolidone-stryene), copolymers of (vinylpyrrolidone-vinylacetate), copolymers of (vinylpyrrolidone-vinylacetate-vinyl alcohol), and copolymers of (acrylonitrile-isopropylacrylamide). All these polymers can be partially and fully fluorinated.

Suitable methanol blocking units include polyvinylalcohol, polyvinylacetate, copolymers of vinylacetate-vinylalcohol, copolymers of ethylene-vinylacetate, copolymers of vinylpyridine-vinylacetate, copolymers of vinylpyridine-vinylalcohol, copolymers of vinylpyridine-vinylacetate-vinylalcohol, copolymer of vinylpyrrolidone-vinylacetate, copolymer of vinylpyrrolidone-vinylacetate-vinylalcohol. The copolymers can be block or random copolymers. Block copolymers are particularly preferred. All these polymers can be partially and fully fluorinated.

Suitable dimensional stabilizer units include hydrophobic polymers. Suitable hydrophobic polymers include polystyrene, copolymer of vinylpyridine-styrene, copolymers of vinylpyrrolidone-styrene, and polyvinylidine fluorid, and its copolymer. Block copolymers are preferred.

Suitable flexible units include vinylidene fluoride copolymers (Flex) and polyphosphazenes.

In one embodiment, the present acid-base polymer blend membrane further comprises an interpenetrating network (IPN) polymer. The IPN polymers can be UV initiated, e-beam initiated, gamma-ray initiated, thermal initiated, and chemical initiated. Suitable UV initiated IPN polymers include polyvinyl cinnamate. Suitable chemical initiated IPN polymers include silica containing polymer networks, such as silica ($—SiO_2—$) cage or copolymers of silica ($—SiO_2—$) and siloxane, made by sol-gel process using tetramethyl orthosilicate (TMOS), tetraethyl orthosilicate (TEOS), and other functional terminated polysiloxanes, such as aminopropyl terminated polydimethylsiloxane, aminopropylmethylsiloxane-dimethylsiloxane copolymers, silanol terminated polydimethylsiloxanes. In some embodiments the IPN polymer is preferably present when at least one other functional unit is present in the blend as a polymer or copolymer. This is especially the preference when chemically initiated IPN polymers are used.

In another embodiment of the present invention, the acid-base polymer blend membrane comprising a polymer or copolymer comprising a flexible unit further comprises an elastomeric polymer or copolymer. Suitable elastomeric polymers include polyacrylonitrile (PAN), acrylonitrile copolymers, polyvinyilidene fluoride, vinylidene fluoride copolymers, polysiloxanes, siloxane copolymers, polyvinylacetate, and polyphosphazenes.

In a preferred embodiment of the present invention, the acid-base polymer blend membrane comprises a first acidic polymer of sulfonated polyetherether ketone (SPEEK), a second basic polymer of polyvinylpyridine (PVP), and a third polymer comprising a hydrophilic unit. The third polymer comprising a hydrophilic unit comprises polyvinylpyrrolidone, poly (n-isopropylacrylamide), poly(2-hydroxy-ethyl methacrylates), copolymers of (vinylpyrrolidone-vinylimidazole), copolymers of (vinylpyrrolidone-dimethylaminoethyl methacrylate), copolymers of (vinylpyrrolidone-stryene), copolymers of (vinylpyrrolidone-vinylacetate), copolymers of (vinylpyrrolidone-vinylacetate-vinyl alcohol), and copolymers of (acrylonitrile-isopropylacrylamide). Block copolymers are particularly preferred. In this embodiment, the acid-base polymer blend membrane can further comprise a dimensional stabilizer unit such as silica containing interpenetrating network polymers, polyvinyldine fluoride, copolymers of vinyldine fluoride, copolymers of vinylacetate-styrene, copolymers of vinylpyrrolidone-styrene.

In another preferred embodiment, the acid-base polymer blend membrane of the present invention comprises a first acidic polymer of sulfonated polyetherether ketone (SPEEK), a second basic polymer of polyvinylpyridine (PVP), and a third polymer comprising a methanol blocking unit. The polymer comprising a methanol blocking unit includes polyvinylalcohol, polyvinylacetate, copolymers of vinylacetate-vinylalcohol, copolymers of ethylene-vinylacetate, copolymers of (vinylpyrrolidone-vinylacetate-vinyl alcohol), copolymers of (vinylpyrrolidone-vinylacetate), copolymers of vinylpyridine-vinylacetate, copolymers of vinylpyridine-vinylalcohol, and copolymers of vinylpyridine-vinylacetate-vinylalcohol. Block copolymers comprising methanol blocking nits such as block copolymers of poly (vinylpyridine-vinylacetate-vinylalcohol) and block copolymers of poly(vinylpyrrolidone-vinylacetate-vinylalcohol) are particularly preferred. Alternatively, the acid-base polymer blend membrane comprises a first polymer of sulfonated polyetherether ketone (SPEEK) and a second copolymer comprising basic subunits and methanol blocking units. The second copolymer comprising basic subunits and methanol blocking units are preferably block copolymers such as poly(vinylpyridine-vinylacetate-vinylalcohol).

BRIEF DESCRIPTION OF THE DRAWINGS

The foregoing and other objects of the invention will be more clearly understood from the following description when read in conjunction with the accompanying drawing in which.

DESCRIPTION OF PREFERRED EMBODIMENTS

Figure 1:
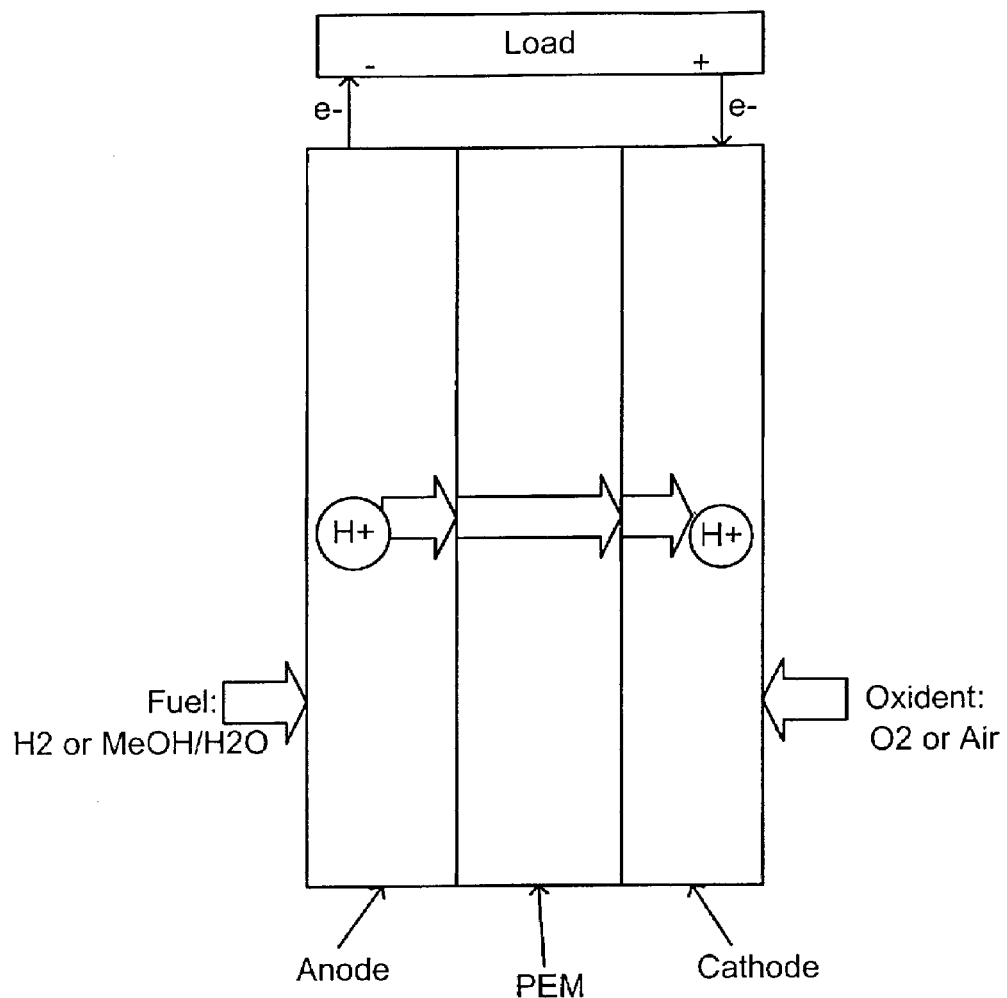
FIG. 1 schematically shows a fuel cell incorporating a proton conducting polymer blend membrane of the present invention.

FIG. 1 schematically shows a fuel cell incorporating the membrane-electrode assembly (MEA) of the present invention. The MEA comprises a solid proton conducting polymer membrane, an anode and a cathode which are supported on the opposing surfaces of the membrane. Each electrode comprises dispersed catalyst materials to form a catalyst layer in contact with each surface of the membrane.

At the anode, the hydrogen or methanol molecules react to form protons and electrons. In the case of methanol used as fuel, carbon dioxide is also formed. The electrons formed at the anode travel to the cathode through an external circuit, which produce electrical current to perform useful work by powering an electrical device. The protons migrate to the cathode through the membrane. At the cathode, oxygen molecules catalytically dissociate and react with the protons and the electrons from the anode to form water.

For a polymer electrolyte membrane fuel cell (PEMFC) using hydrogen as the fuel and oxygen as the oxidant, the reactions at the anode and cathode of the MEA are shown in equations below:

$$\text{Anode: } 2H_2 \rightarrow 4H^+ + 4e^- \quad (I)$$

$$\text{Cathode: } 4e^- + 4H^+ + O_2 \rightarrow 2H_2O \quad (II)$$

The hydrogen can be supplied in the form of substantially pure hydrogen or as a hydrogen-containing reformate, for example, the product of the reformation of methanol and water or the product of the reformation of natural gas or of other liquid fuels. Similarly, the oxygen can be provided as substantially pure oxygen or the oxygen can be supplied from air at ambient or elevated pressure.

For a direct methanol fuel cell (DMFC) using methanol as the fuel and oxygen as the oxidant, the reactions at the anode and cathode of the MEA are shown in equations below:

$$\text{Anode: } CH_3OH + 2H_2O \rightarrow CO_2 + 6H^+ + 6e^- \quad (III)$$

$$\text{Cathode: } 6e^- + 6H^+ + 3O_2 \rightarrow 3H_2O \quad (IV)$$

The methanol can be supplied in the form of a dilute methanol solution having a concentration of 1 to 50 mol % methanol in water. The oxygen can be provided as substantially pure oxygen or the oxygen be supplied from air at ambient or elevated pressure.

The proton conducting membrane of the present invention comprise an acid-base polymer blend membrane. The acid-base polymer blend membrane of the present invention comprises a first acidic polymer having acidic subunits, a second basic polymer having basic subunits, and a third polymer containing one or more functional units for improving membrane conductivity, flexibility, water remaining ability, dimension stability, adhesion/bonding ability and methanol crossover. In one embodiment, the acid-base polymer blend membrane of the invention comprises a first acidic polymer having acidic subunits and a second basic polymer having basic subunits, wherein at least one of the first acidic and second basic polymer comprises one or more functional units to improve the properties of the membrane. The functional units used to improve the membrane properties include hydrophilic units, adhesion promoter units, dimensional stabilizer units, and flexible units.

As used herein, the term "acidic polymer" refers to a polymeric backbone which contains one or more acidic subunits. The acidic polymer provides proton-conducting capability for electrochemical devices, especially for polymer electrolyte membrane based fuel cells such as PEMFCs and DMFCs. Preferably, the backbone contains carbon alone, or in combination with oxygen, nitrogen or sulfur. The acidic subunits are preferably sulphonic acid, phosphoric acid and carboxylic acid groups.

Examples of acidic polymers containing sulfonic acid groups include perfluorinated sulfonated hydrocarbons, such as Nafion7; sulfonated aromatic polymers such as sulfonated polyetheretherketone (SPEEK), sulfonated polyetherethersulfone (SPEES), sulfonated polybenzobisbenzazoles, sulfonated polybenzothiazoles, sulfonated polybenzimidazoles, sulfonated polyamides, sulfonated polyetherimides, sulfonated polyphenyleneoxide, sulfonated polyphenylenesulfide, and other sulfonated aromatic polymers. The sulfonated aromatic polymers may be partially or fully fluorinated. Other sulfonated polymers include polyvinylsulfonic acid, sulfonated polystyrene, copolymers of acrylonitrile and 2-acrylamido-2-methyl-1 propane sulfonic acid, acrylonitrile and vinylsulfonic acid, acrylonitrile and styrene sulfonic acid, acrylonitrile and methacryloxyethyleneoxypropane sulfonic acid, acrylonitrile and methacryloxyethyleneoxytetrafluoroethylenesulfonic acid, and so on. The polymers may be partially or fully fluorinated. Any class of sulfonated polymer include sulfonated polyphosphazenes, such as poly(sulfophenoxy)phosphazenes or poly(sulfoethoxy)phosphazene. The phosplazene polymers may be partially or fully fluorinated. Sulfonated polyphenylsiloxanes and copolymers, poly(sulfoalkoxy)phosphazenes, poly(sulfotetrafluoroethoxypropoxy) siloxane.

Examples of acidic polymers containing carboxylic acid groups include polyacrylic acid, polymethacrylic acid, any of their copolymers including copolymers with vinylimidazole or acrylonitrile, and so on. The polymers may be partially or fully fluorinated.

Examples of acidic polymers containing phosphoric acid groups include polyvinylphosphoric acid, polybenzimidazole phosphoric acid and so on. The polymers may be partially or fully fluorinated.

Preferably, the acidic polymers are sulfonated polyetheretherketone, sulfonated polyetherethersulfone, sulfonated polyetherimide, and sulfonated polyethersulfone. More preferably, the acidic polymer is sulfonated polyetheretherketon (SPEEK). It is preferred that the SPEEK be sulfonated between 50 to 200%, more preferably between 70 to 150%, and most preferably between 80 to 120%. In this regard, 100% sulfonation means every polymer repeating unit contains one sulfonic acid group.

The concentration of the acidic polymer in the membrane varies from about 10% to 99% by weight, more preferably 30 to 95% by weight, and most preferably 70 to 90% by weight.

As used herein, the term "basic polymer" refers to a polymeric backbone which contains one or more basic subunits. The basic polymer forms pseudo acid-base interaction in the membrane to stabilize the acidic polymer from dissolution in water or high humidity environment. In a preferred embodiment, the backbone of the basic polymer contains carbon alone or in combination with oxygen, nitrogen or sulfur. Particularly preferred backbones include aliphatic backbones although aromatic polymer backbones may also be used. More particularly, a basic polymer contains basic subunits which preferably comprise basic groups such as aromatic amines, aliphatic amines or heterocyclic nitrogen containing groups, heterocyclic oxygen containing groups, and heterocyclic sulfur containing groups.

Examples of basic polymers include aromatic polymers such as polybenzimidazole, polyvinylimidazole, polyvinylpyridine, N-alkyl or N-arylpolybenzimidazoles, polybenzothiazoles, polybenzoxazoles, polyquinolines, and in general polymers containing functional groups with heteroaromatic nitrogens, such as oxazoles, isooxazoles, carbazole, indoles, isoindole, 1,2,3-oxadiazole, 1,2,3-thiadiazole, 1,2,4-thiadiazole, 1,2,3-triazole, benzotriazole, 1,2,4-traozole, tetrazole, pyrrole, N-alkyl or N-aryl pyrrole, pyrrolidine, N-alkyl and N-arylpyrrolidine, pyridine, pyrrazole groups and so on. These polymers may be optionally partially or fully fluorinated.

Examples of aliphatic polyamines include polyethyleneimines, polyvinylpyridine, poly(allylamine), and so on. These basic polymers may be optionally partially or fully fluorinated.

Preferably the basic polymers are polybenzimidazole (PBI), polyvinyimidazole (PVI), and polyvinypyridine (PVP). More preferably the basic polymer are PBI and PVP. Most preferably the basic polymer is PVP.

The basic polymer is preferably a block copolymer with one block having basic subunits. The block copolymer can be di-block, tri-block or multi-block copolymer. Examples of basic block copolymers include styrene-4-vinylpyridine block copolymer (styrene content 0~80 wt %, preferably 5~60 wt %, the most preferably 10~40 wt %), acrylonitrile-4-vinylpyridine block copolymer, and styrene-4-vinylpyridine-acrylic acid tri-block copolymer (to improve hydration characteristics). The molar ratio of acid group in PEEK to the base group in polyvinylpyridine block must be greater than 50:50.

The concentration of the basic polymer in the polymer blend membrane varies from 0.5% to 50%, preferably 2.5 to 40%, more preferably 5 to 25% by weight.

As used herein, the term "functional unit" refers to functional groups contained in a polymer or copolymer that can improve membrane conductivity, flexibility, water remaining ability, dimension stability, adhesion/bonding ability, and reduce methanol crossover. The functional units used to improve the membrane properties include hydrophilic units, methanol blocking units, dimensional stabilizer units, and flexible units.

"Hydrophilic units" are used in the present acid-base polymer blend membrane to improve the membrane hydration rate and water retaining ability without significant loss of the dimension stability and methanol blocking ability. Suitable hydrophilic polymers include polyvinylpyrrolidone, poly (n-isopropylacrylamide), poly(2-hydroxy-ethyl methacrylates) (HEMA). The hydrophilic units can also be copolymerized with other functional groups for adjusting dimensional stability, methanol crossover and mechanical properties. Examples include copolymers of (vinylpyrrolidone-vinylimidazole), copolymers of (vinylpyrrolidone-dimethylaminoethyl methacrylate), copolymers of (vinylpyrrolidone-stryene), copolymers of (vinylpyrrolidone-vinylacetate), copolymers of (vinylpyrrolidone-vinylacetate-vinyl alcohol), and copolymers of (acrylonitrile-isopropylacrylamide). The copolymers can be block or random copolymers. Block copolymers are particularly preferred.

The concentration of the hydrophilic polymer in the membrane is preferably from about 0.1 to 20% by weight, more preferably 1 to 5% by weight.

"Methanol blocking units" are used in the acid-base polymer blend membrane to decrease the methanol permeability in DMFC application, thus improving the fuel efficiency, and prolonging the use life of fuel cell. Suitable methanol blocking units include polyvinylalcohol, polyvinylacetate, copolymers of (vinylpyrrolidone-vinylacetate), copolymers of (vinylpyrrolidone-vinylacetate-vinyl alcohol), copolymers of vinylacetate-vinylalcohol, copolymers of ethylene-vinylacetate, copolymers of vinylpyridine-vinylacetate, copolymers of vinylpyridine-vinylalcohol, and copolymers of vinylpyridine-vinylacetate-vinylalcohol. The copolymers can be block or random copolymers. Block copolymers are particularly preferred.

"Dimensional stabilizer units" are used in the present acid-base polymer blend membrane to improve the membrane dimension stability. Suitable dimensional stabilizer units include hydrophobic polymers. Suitable hydrophobic polymers include polystyrene, copolymers of vinylpyridine-styrene, and copolymers of vinylpyrrolidone-styrene. Block copolymers are preferred.

The concentration of the hydrophobic polymer in the membrane is preferably from about 0.1 to 50 percent by weight, more preferably from 5 to 20 percent by weight.

"Flexible units" are used in the present polymer blend membrane to improve the mechanical properties of the membrane and the adhesion of the membrane in the MEA. Suitable flexible units include vinylidene fluoride-hexafluoropropylene-copolymers (Kynar Flex) and polyphosphazenes.

The concentration of the flexible units in the polymer blend system is preferably from about 0.1 to 50 percent by weight, more preferably from 2 to 20 percent by weight.

In one embodiment, the acid-base polymer blend membrane of the present invention comprises a first acidic polymer having acidic subunits, a second basic polymer having basic subunits, a third polymer containing one or more functional units, and further comprising an interpenetrating network (IPN) polymer. Alternatively, the acid-base polymer blend membrane comprises a first acidic polymer, a second basic polymer, wherein at least one of the first acidic and second basic polymer contains one or more functional units, and further an interpenetrating network (IPN) polymer. The IPN polymer is incorporated in the polymer blend to enhance the membrane dimension stability. The IPN polymers can be UV initiated, e-beam initiated, gamma-ray initiated, thermal initiated, and chemically initiated. When IPN's or semi-IPN's are used it is preferred that a polymer or copolymer comprising a functional unit also be present in one or more other polymers or copolymers in the blend.

Suitable UV initiated IPN polymers include polyvinyl cinnamate. The preferred concentration of the UV initiated IPN polymer in the membrane varies from 0.5 to 30%, more preferably 1 to 5% by weight.

Suitable chemical initiated IPN polymers include silica containing polymers made by sol-gel process. Silica containing polymers have good water retaining ability. In addition, silica containing polymers can also provide good bonding mechanism in a MEA if a coupling agent is used in the catalyst ink. Examples of silica containing polymer network include —$SiO_2$— cage made by sol-gel process using tetramethyl orthosilicate (TMOS), tetraethyl orthosilicate (TEOS), and copolymer of silicate —$SiO_2$— and functional group terminated polysiloxanes with different molecular weight for adjusting the network size. The functional group terminated polysiloxane includes aminopropyl terminated polydimethylsiloxanes, aminopropylmethylsiloxane-dimethylsiloxane copolymer, silanol terminated polydimethylsiloxanes. The preferred concentration of silica containing agents in the present acid-base polymer blend membrane varies from 0.01% to 50% by weight, more preferably from 0.1% to 25% by weight.

In another embodiment, the acid-base polymer blend membrane of the present invention comprises a first acidic polymer having acidic subunits, a second basic polymer having basic subunits, a third polymer containing one or more functional units, and further an elastomeric polymer or copolymer. Alternatively, the acid-base polymer blend membrane comprises a first acidic polymer, a second basic polymer, wherein at least one of the first acidic and second basic polymer contains one or more functional units, and further an elastomeric polymer. The elastomeric polymer is incorporated in the polymer blend to enhance the membrane mechanical properties and reduce methanol permeability.

As used herein, an "elastomeric polymer" refers to a polymeric backbone which contains one or more elastomeric sub-units. In a preferred embodiment, the backbone contains carbon alone or in combination with oxygen, nitrogen, fluorine or sulfur. Particularly preferred embodiments include aliphatic backbones although aromatic polymer backbones may also be used. More particularly, an elastomeric polymer comprises elastomeric subunits which preferably contain elastomeric groups such as nitrile, vinylidene fluoride, siloxane and phosphazene groups. Examples of elastomeric polymers include polyacrylonitrile (PAN), acrylonitrile copolymers, polyvinyilidene fluoride, vinylidene fluoride copolymers, polysiloxanes, siloxane copolymers and polyphosphazenes, such as poly(trifluorethoxy)phosphazene.

The elastomeric polymer may be added to the acid-base polymer blend membrane in the form of polymerizable monomer to fabricate semi-interpenetrating networks. The monomers may be polymerized photochemically or by thermal treatment for the semi-IPN.

Alternatively, the elastomeric polymer incorporated into the acid-base blend polymer membrane is a copolymer. An elastomeric copolymer refers to an elastomeric polymer which contains elastomeric subunits and one or more acidic subunits or basic subunits depending upon which embodiment of the invention is being practiced. For instance, when an acidic polymer such as sPEEK is used, an elastomeric copolymer comprising elastomeric subunits and basic subunits may be used in a binary polymer composition. Alternatively, the elastomeric copolymer can comprise elastomeric subunits and acid subunits. Such binary mixtures may be used in conjunction with other polymers and copolymers comprising the functional units as described herein to form multi component acid-base polymer blend membrane within the scope of the invention.

In a preferred embodiment, the acid-base polymer blend membrane of the present invention comprises a first acidic polymer of sulfonated polyetherether ketone (SPEEK), a second basic polymer of polyvinylpyridine (PVP), and a third polymer comprising a hydrophilic unit. The third polymer comprising a hydrophilic unit comprises polyvinylpyrrolidone, poly (n-isopropylacrylamide), poly(2-hydroxy-ethyl methacrylates), copolymers of (vinylpyrrolidone-vinylimidazole), copolymers of (vinylpyrrolidone-dimethylaminoethyl methacrylate), copolymers of (vinylpyrrolidone-stryene), copolymers of (vinylpyrrolidone-vinylacetate), copolymers of (vinylpyrrolidone-vinylacetate-vinyl alcohol), and copolymers of (acrylonitrile-isopropylacrylamide). Block copolymers are particularly preferred. In this embodiment, the acid-base polymer blend membrane can further comprise a dimensional stabilizer unit such as copolymers of vinylpyridine-styrene, and copolymers of vinylpyrrolidone-styrene. In this embodiment, the acid-base polymer blend membrane may further comprises an interpenetrating network (IPN) polymer and hydrophobic polymer to improve the dimension stability of the membrane. Further, in this embodiment, the acid-base polymer blend may additionally comprise elastomeric polymer to enhance the mechanical properties of the membrane and reduce the methanol permeability.

In another preferred embodiment, the acid-base polymer blend membrane of the present invention comprises a first acidic polymer of sulfonated polyetherether ketone (SPEEK), a second basic polymer of polyvinylpyridine (PVP), and a third polymer comprising a methanol blocking unit. The polymer comprising a methanol blocking unit includes polyvinylalcohol, polyvinylacetate, copolymers of vinylacetate-vinylalcohol, copolymers of ethylene-vinylacetate, copolymers of poly(vinylpyrrolidone-vinylacetate-vinylalcohol, copolymers of poly(vinylpyrrolidone-vinylalcohol), copolymers of vinylpyridine-vinylacetate, copolymers of vinylpyridine-vinylalcohol, and copolymers of vinylpyridine-vinylacetate-vinylalcohol. Block copolymers comprising methanol blocking units such as block copolymers of poly(vinylpyridine-vinylacetate-vinylalcohol) and block copolymers of poly(vinylpyrrolidone-vinylacetate-vinylalcohol) are particularly preferred. Alternatively, the acid-base polymer blend membrane comprises a first polymer of sulfonated polyetherether ketone (SPEEK) and a second copolymer comprising basic subunits and methanol blocking units. The second copolymer comprising basic subunits and methanol blocking units are preferably block copolymers such as poly(vinylpyridine-vinylacetate-vinylalcohol).

In a further preferred embodiment, the acid-base polymer blend membrane of the present invention comprises a first acidic polymer of sulfonated polyetherether ketone (SPEEK), a second basic polymer of polyvinylpyridine (PVP), and a third polymer comprising a dimensional stabilizer unit. The polymer comprising dimensional stabilizer units includes hydrophobic polymers. The hydrophobic polymer preferably comprises copolymers of vinylpyridine-styrene and copolymers of vinylpyrrolidone-styrene.

One advantage of the proton conducting polymer blend membrane of the present invention is that it allows tailoring a membrane-electrode assembly for a specific application by incorporating one or more particular functional units into a polymer blend system to improve or modify the property of the membrane as required for such application. Another advantage is that the present polymer blend membrane can be embedded in an IPN polymer structure to improve dimension stability of the membrane. IPN polymer structure is advantageous in many ways over chemical linkage which often results in low proton conductivity and membrane brittleness. A further advantage of the present polymer blend membrane is that it can be maximally optimized to create a structure having high conductivity, low methanol crossover rate, good dimension stability and water retaining ability at same time by incorporating various functional units.

The present polymer blend membrane is particularly useful in fabrication of membrane-electrode assemblies for PEFCs and DMFCs. The MEA can be fabricated by directly applying a catalyst ink onto the surfaces of the membrane using a range of techniques including sputtering, painting, electro-deposition, spraying, decal transferring, filtering and filtering transfer, tape casting, and screen printing. The coated layers can then be hot or cold pressed or calendered. Alternatively, a catalyst ink can be applied onto a backing layer to be indirectly transferred to the membrane surfaces.

The following examples are provided to demonstrate the present acid-base proton conducting polymer blend membrane but not intended to limit the invention in any way.

Examples 1-7 illustrate binary polymer blend membrane system with PVP block copolymers.

EXAMPLE 1

0.7 g of sulfonated polyetheretherketone (SPEEK) was dissolved in 12.0 g of dimethylacetamide (DMAC). To this solution was added 0.2 g of ammonia, and then 0.3 g of poly(styrene-b-4-vinylpyridine) (Mn of polystyrene block=160K, Mn of polyvinylpyridine block=80K). The resulting homogeneous solution was cast at room temperature into a 12.5 cm×12.5 cm mold. After drying at room temperature, the polymer membrane was soaked in 1.5M sulfuric acid solution for 16 hours, and finally rinsed with deionized water.

The polymer membrane was swollen in water at room temperature (water uptake 24%). The polymer membrane conductivity was measured by AC impedance. The polymer membrane was swollen in 4M methanol aqueous mixture at 80° C. for 24 hours to measure the expansion stability. Methanol crossover was measured in 4M MeOH using H-Cell, and the permeation rate was obtained by gas chromatography analysis.

EXAMPLE 2

0.8 g of sulfonated polyetheretherketone (SPEEK) was dissolved in 14.0 g of dimethyl acetamide (DMAC). To this solution was added 0.3 g of 30% ammonium hydroxide, then 0.2 g of poly(styrene-b-4-vinylpyridine) (Mn of polystyrene block=160K, Mn of polyvinylpyridine block=80K). The resulting mixture was stirred overnight. The resulting solution was cast onto a 5"×5" glass frame. The membrane was dried at room temperature for two days, then vacuum dried at 60° C. for 8 hours. The resulting membrane was soaked in 1.5M $H_2SO_4$ at room temperature overnight. The membrane was then rinsed with deionized water to remove any traces of acid.

EXAMPLE 3

The same procedure was employed as in Example 1 except that 0.9 g SPEEK, 15.0 g DMAC, 0.3 g ammonia, and 0.1 g poly(styrene-b-4-vinylpyridine) (Mn of polystyrene block=160K, Mn of polyvinylpyridine block=80K) were used.

EXAMPLE 4

The same procedure was employed as in Example 1 except that 0.75 g SPEEK, 12.0 g DMAC, 0.3 g ammonia, and 0.25 g poly(styrene-b-4-vinylpyridine) (Mn of polystyrene block=130K, Mn of polyvinylpyridine block=80K) were used.

EXAMPLE 5

The same procedure was employed as in Example 1 except that 0.8 g SPEEK, 14.0 g DMAC, 0.3 g ammonia, and 0.2 g poly(styrene-b-4-vinylpyridine) (Mn of polystyrene block=130K, Mn of polyvinylpyridine block=80K) were used.

EXAMPLE 6

The same procedure was employed as in Example 1 except that 0.8 g SPEEK, 14.0 g DMAC, 0.3 g ammonia, and 0.2 g poly(styrene-b-4-vinylpyridine) (Mn of polystyrene block=20K, Mn of polyvinylpyridine block=60K) were used.

EXAMPLE 7

The same procedure was employed as in Example 1 except that 0.85 g SPEEK, 14.0 g DMAC, 0.3 g ammonia, and 0.15 g poly(styrene-b-4-vinylpyridine) (Mn of polystyrene block=20K, Mn of polyvinylpyridine block=60K) were used.

The results of conductivity, water uptake, stability, and methanol permeation of the binary blend with PVP block copolymer membranes made by examples 1-7 are shown in Table 1.

TABLE 1

| Example No. | Conductivity (S/cm) | Water Uptake (wt %) | Stability at 80° C. (% by area) | MeOH Permeation Rate (/$10^{-7}$ $cm^2/s$) |
|---|---|---|---|---|
| Example 1 | 0.021 | 24 | 57 | .92 |
| Example 2 | 0.058 | 59 | >300 | — |
| Example 3 | 0.092 | Swells much | — | — |
| Example 4 | 0.021 | 25 | 89 | 1.6 |
| Example 5 | 0.048 | 38 | 217 | 3.4 |
| Example 6 | 0.009 | 12 | 33 | 0.6 |
| Example 7 | 0.022 | 22 | 69 | 1.4 |

Examples 8-10 illustrate comparison of PVP homopolymer system with above described block copolymer system.

EXAMPLE 8

The same procedure was employed as in Example 1 except that 0.86 g SPEEK, 15.0 g DMAC, 0.3 g ammonia, and 0.14 g poly(4-vinylpyridine) (Mw=200K) were used.

EXAMPLE 9

The same procedure was employed as in Example 1 except that 0.88 g SPEEK, 15.0 g DMAC, 0.3 g ammonia, and 0.12 g poly(4-vinylpyridine) (Mw=200K) were used.

EXAMPLE 10

The same procedure was employed as in Example 1 except that 0.9 g SPEEK, 15.0 g DMAC, 0.3 g ammonia, and 0.1 g poly(4-vinylpyridine) (Mw=200K) were used.

The results of conductivity, water uptake, stability, and methanol permeation are shown in Table 2.

TABLE 2

| Examples | Conductivity (S/cm) | Water Uptake (wt %) | Stability at 80° C. (% by area) | MeOH Permeation Rate (/$10^{-7}$, $cm^2/s$) |
|---|---|---|---|---|
| Example 8 | 0.012 | 22 | 59 | 1.0 |
| Example 9 | 0.022 | 27 | 107 | 1.8 |
| Example 10 | 0.030 | 32 | 161 | 2.4 |

Examples 11-12 illustrate comparison of random copolymers with above described block copolymer systems.

EXAMPLE 11

The same procedure was employed as in Example 1 except that 0.86 g SPEEK, 15.0 g DMAC, 0.3 g ammonia, and 0.14 g poly(styrene-co-4-vinylpyridine) (Mw=350K, styrene content 10 wt %) were used.

EXAMPLE 12

The same procedure was employed as in Example 1 except that 0.88 g SPEEK, 15.0 g DMAC, 0.3 g ammonia, and 0.12 g poly(styrene-co-4-vinylpyridine) (Mw=350K, styrene content 10 wt %) were used.

The results of conductivity, water uptake, stability, and methanol permeation are shown in Table 3.

TABLE 3

| Examples | Conductivity (S/cm) | Water Uptake (wt %) | Stability at 80° C. (% by area) | MeOH Permeation Rate (/10⁻⁷, cm²/s) |
|---|---|---|---|---|
| Example 11 | 0.014 | 23 | 115 | 1.6 |
| Example 12 | 0.023 | 30 | 219 | 2.6 |

Examples 13-17 illustrate addition of IPN system to hold the dimension stability of the membranes over temperature.

EXAMPLE 13

This example describes a four-component membrane comprising 80% SPEEK, 11% PVI, 9% copolymer of acrylonitrile-vinylimidazole, and 1% of poly(vinyl cinnamate).

0.8 g of sulfonated PEEK was dissolved in 10 g DMAC. To this solution was added 0.2 g of ammonium hydroxide, then 0.11 g of poly(vinylimidazole) (1.375 g of a 8% PVI in DMAC). 0.09 g of copolymer of acrylonitrile-vinylimidazole (molar ratio 33:1) was added (1.5 g of 6% copolymer in DMAC). 0.01 g poly(vinyl cinnamate) was added. The clear solution was cast at room temperature on a 12×12 cm glass frame. After drying at room temperature, the polymer membrane was exposed to UV light for half hour and soaked in 1.5 M sulfuric acid for 10 hours, then soaked in deionized water. The membrane conductivity was 0.023 S/cm, water uptake 30%.

EXAMPLE 14

This example describes a membrane comprising silica IPN structure with composition of 88% SPEEK, 11% PVP, and 1% TMOS.

0.75 g of sulfonated PEEK was dissolved in 10 g DMAC. To this solution was added 0.07 g ammonium hydroxide, followed by addition of 0.10 g of PVP (1.16 g of 8.6% PVP in DMAC), and then 0.10 g of TMOS. The clear solution was cast at room temperature on a 12×12 cm glass frame. After drying at room temperature the polymer membrane was soaked in 1.5 M sulfuric acid for 10 hours, then soaked in deionized water. The membrane conductivity was 0.014 S/cm, the temperature stability at 80° C. was 76%. The methanol permeation rate was $1.4 \times 10^{-7}$ cm²/s. The fuel cell performance was 30 mW/cm² at 0.3 volt, 4M MeOH, and room temperature. The crossover rate in the cell is 55 mA/cm², as compared to 120 mA/cm² for Nafion® membrane.

EXAMPLE 15

This example describes a three-component membrane based on SilicaI-IPN structure. Each membrane was made as described in Example 1 except for the amount used. The results of conductivity and water uptake at 4M MeOH 80° C. are shown in Table 4.

TABLE 4

| Composition % (SPEEK/PVP/TMOS) | Conductivity S/cm | Water Uptake wt % |
|---|---|---|
| 94/05/01 | 0.065 | 240 |
| 90/9/01 | 0.022 | 150 |

EXAMPLE 16

This example illustrates a four-component membrane comprising 87% SPEEK, 12.7% PVP, 0.09% aminopropyl terminated polydimethylsiloxane (A12, from Gelest Inc.), and 0.2% TMOS by weight.

0.75 g of sulfonated PEEK was dissolved in 10 g DMAC. To this solution, 0.07 g of ammonium hydroxide was added, followed by addition of 0.10 g of PVP (1.16 g of 8.6% PVP in DMAC), and then 0.3 g of A12 and 0.06 g of TMOS. The cloudy solution was cast at room temperature on a 12×12 cm glass frame. After drying at room temperature, the polymer membrane was soaked in 1.5 M sulfuric acid for 10 hours, then soaked in deionized water. The membrane conductivity was 0.025 S/cm, and the temperature stability at 80° C. was 18%.

EXAMPLE 17

This example illustrates a multi-component membrane comprising 85% SPEEK, 11.6% PVI, 3% PAN, 0.05% aminopropyl terminated polydimethylsiloxane (A12, from Gelest Inc.), and 0.3% TMOS by weight.

0.75 g of sulfonated PEEK was dissolved in 10 g DMAC. To this solution was added 0.07 g of ammonium hydroxide, then 0.06 g of PAN (0.5 g of 7.8% PAN in DMAC), followed by 0.10 g of PVI (1.16 g of 8.6% PVI in DMAC), and then 0.15 g of A12 and 0.09 g of TMOS. The cloudy solution was cast at room temperature on a 12×12 cm glass frame. After drying at room temperature, the polymer membrane was soaked in 1.5 M sulfuric acid for 10 hours, then soaked in deionized water. The membrane conductivity was 0.03 S/cm, and the temperature stability at 80° C. was 66%. The methanol permeation rate was $8.6 \times 10^{-7}$ cm²/s. In comparison, a membrane with similar formulation without Silica content had methanol permeation rate $1.6 \times 10^{-6}$ cm²/s, and was broken after soaking at 80° C. in 4M MeOH overnight.

Examples 18-21 illustrate addition of hydrophilic domain to improve the water retaining ability of the membrane.

EXAMPLE 18

This example describes a membrane comprising 80% SPEEK, 11% PVP and 9% copolymer of acrylonitrile-isopropyl acrylamide (molar ratio 40:1).

0.8 g of sulfonated PEEK was dissolved in 10 g DMAC. To this solution was added 0.2 g of ammonium hydroxide, then 0.11 g of PVP (1.375 g of 8% PVP in DMAC), followed by 0.09 g of copolymer of acrylonitrile-isopropyl acrylamide (1.5 g of 6% copolymer in DMAC). The clear solution was cast at room temperature on a 12×12 cm glass frame. After drying at room temperature, the polymer membrane was soaked in 1.5M sulfuric acid for 10 hours, then soaked in deionized water. The membrane conductivity was 0.018 S/cm, and water uptake 28%.

EXAMPLE 19

This example describes a three-component membrane based on SPEEK/PVP/copolymer of acrylonitrile-isopropyl acrylamide. The membrane was made as described in Example 18 except for the amount used. The results of conductivity and water uptake at room temperature are shown in Table 5.

TABLE 5

| Composition % (SPEEK/PVP/Copolymer) | Conductivity S/cm | Water Uptake wt % |
|---|---|---|
| 80/11/9 | 0.018 | 28 |
| 80.5/10.5/9 | 0.022 | 26 |

EXAMPLE 20

This example describes a membrane comprising 88% SPEEK, 13% PVP and 1% copolymer vinylimidazole-vinylpyrrolidone (molar ratio 1:1).

0.8 g of sulfonated PEEK was dissolved in 10 g DMAC. To this solution was added 0.2 g of ammonium hydroxide, then 0.11 g of PVP was then added (1.375 g of 8% PVP in DMAC), followed by 0.01 g of copolymer of vinylimidazole-vinylpyrrolidone (0.5 g of 6% copolymer in DMAC). The clear solution was cast at room temperature on a 12×12 cm glass frame. After drying at room temperature, the polymer membrane was soaked in 1.5M sulfuric acid for 10 hours, then soaked in deionized water. The membrane conductivity was 0.014 S/cm, water uptake 24%. The temperature stability at 80° C. in 4M MeOH solution was 95%. The fuel cell performance was 25 mW/cm$^2$ at room temperature, 4M MeOH and 0.3 volt. The methanol crossover rate in the cell was 63 mA/cm$^2$. The methanol permeation rate was $1.3 \times 10^{-7}$ cm$^2$/s.

Examples 21-23 illustrate addition of a flexible unit to the polymer blend membrane.

EXAMPLE 21

This example describes a membrane comprising 80% SPEEK, 11% PVI, and 9% vinylidene fluoride-hexafluoropropylene copolymer (Kynar Flex).

0.8 g of sulfonated PEEK is dissolved in 10 g DMAC. To this solution was added 0.2 g of ammonium hydroxide, then 0.11 g of poly(vinylimidazole) (1.375 g of 8% PVI in DMAC), followed by 0.09 g of Kynar Flex (1.5 g of 6% Flex in DMAC). The clear solution was cast at room temperature on a 12×12 cm glass frame. After drying at room temperature, the polymer membrane was soaked in 1.5M sulfuric acid for 10 hours, then soaked in deionized water. The membrane conductivity was 0.021 S/cm, and water uptake 36%.

EXAMPLE 22

This example describes a three-component membrane based on SPEEK/PVI/Kynar Flex. The membrane was made as described in Example 21 except for the amount used. The results of conductivity and water uptake at room temperature are shown in Table 6.

TABLE 6

| Composition % (SPEEK/PVI/Flex) | Conductivity S/cm | Water Up-take wt % |
|---|---|---|
| 80/11/9 | 0.021 | 36 |
| 82.7/12.3/6 | 0.036 | 40 |
| 85.3/11.7/3 | 0.041 | 41 |

EXAMPLE 23

This example uses polybis(trifluoroethoxy)phosphazene (TFE-PN) as a flexible polymer unit added to the membrane formulation:

Sulfonated PEEK (sPEEK) (4.9 g was dissolved in DMAC (14.9 g). While stirring with an overhead mixer, a 5% solution of TFE-PN in DMAC (6.2 g) was added to this solution. While ammonia gas was bubbling in the solution, a 19.6% solution of poly(4-vinylpyridine) (PVP) (3.4 g) was added. In this formulation, the ratio of sPEEK/PVP is 88/12 and the TFE-PN comprises 5% by weight of the total mass of all polymers present. The solution was coated and dried into a 2-mil thick film, soaked in 1.5M H$_2$SO$_4$ at room temperature overnight and then washed in deionized water.

TABLE 7

| sPEEK/PVP(TFE-PN) | Conductivity (S/cm2) | Swelling (8 M@80 C.) |
|---|---|---|
| 88/12 (5) | 0.024 | 154% |
| 88/12 (10) | 0.007 | 68% |

Example 24-25 illustrate acid-base polymer blend membranes of present invention comprising methanol blocking units

EXAMPLE 24

This example describes a ternary blend membrane system comprising 1% copolymers of (vinyl alcohol-vinylacetate-vinylpyrrolidone) (PVA-PVAc-PVPd copolymer) (40%PVPd), 85% SPEEK, and 14% polyvinylpyridine.

4 g of sulfonated PEEK was dissolved in DMAC (16 g). The solution was purged with anhydrous ammonium gas, then 0.66 g of copolymer was added (3.35 g of 19.69% polyvinylpyridine in DMAC), followed by 0.05 g of PVAc-PVPd copolymer (40% PVPd) (0.37 g of a 13% copolymer solution). The resulting clear solution was coated at room temperature, then at 40° C. in a coating oven, and then at 50° C. in a drying oven for 2 hours. The polymer membrane was then soaked in 5M sulfuric acid for half hour, then soaked in deionized water. The membrane conductivity was 0.011 S/cm, swelling at 8M MeOH and 80° C. 167%, methanol cross-over permeate rate $9 \times 6 \times 10^{-8}$ cm$^2$/s.

EXAMPLE 25

This example describes a ternary membrane system based on SPEEK/PVP/PVAc-PVA-PVPd copolymer. The membrane was made as described in the above example except for the ratio used. The membrane was consisted of 82% SPEEK, 13% polyvinylpyridine, and 5% of PVAc-PVPd (40% PVPd) copolymer. The conductivity of the membrane was 0.01 S/cm, swelling at 8M MeOH and 80° C. 172%, methanol crossover permeate rate $8.0 \times 10^{-8}$ cm$^2$ is.

EXAMPLE 26

This example illustrates the use of dimensional stabilizer in the acid-base polymer blend membrane. Each membrane was made as described in Example 17 except for the amount used. The conductivity and swelling data are shown in Table 8.

TABLE 8

| Composition % (SPEEK/PVP/A12/TMOS) | Conductivity S/cm | Swelling % at 80° C. and in 8 M MeOH |
|---|---|---|
| 70/13/14/3 | 0.01 | 20 |
| 72/12/14/2 | 0.013 | 70 |
| 75/12/11/2 | 0.02 | 140 |
| 62/8/23/6 | 0.022 | 54 |

EXAMPLE 27

This example describes a ternary membrane system comprising 73% of SPEEK, 13% of polyvinylpyridine, and 14% of A12 (aminopropyl terminated polydimethylsiloxane). The membrane was made as described in the above example. The conductivity of membrane was 0.007 S/cm, swelling at 80° C. in 8M MeOH 57%.

EXAMPLE 28

This example illustrates comparison of the membranes comprising functional units of the present invention and the membranes containing polyacrylonitrile (PAN) or acrylonitrile-vinylimidazole copolymer without the functional units of the present invention. The membranes were soaked in 8M MeOH at 80° C. overnight. The mechanical property of the membranes was test after soaking. The results are shown in Table 9.

TABLE 9

| Membrane Composition | Stability Test |
| --- | --- |
| SPEEK/PVI/PAN | Broken |
| SPEEK/PVI/PAN-VI | Broken |
| SPEEK/PVP/A12/TMOS | No Breaking |
| SPEEK/PVP/PVpd--VI | No Breaking |

EXAMPLE 29

This example illustrates the preparation of sulfonated poly ether ether ketone (SPEEK).

Sulfonated poly ether ether ketone (SPEEK) was synthesized by treating PEEK polymer with sulfuric acid or chlorosulfonic acid. The PEEK was dispersed in 100 percent sulfuric acid or chlorosulfonic acid. The polymer and the acid were reacted for 60 hours at 25° C. This reaction could be accelerated and completed within between one and five hours when the temperature was raised to approximately 40° C. The temperature was controlled not higher than 65° C. to avoid over-sulfonation of the PEEK.

After the synthesis was completed, the sulfonated PEEK was precipitated in ice water at a temperature of less than about 5° C. The sulfonated PEEK became solid instantly in ice water. The particle size of the solid sulfonated PEEK depended on the speed of addition of the sulfonated PEEK into the ice water and the technique used. If the sulfonated PEEK was dropped into ice water in a continuous stream, a strand and wrap were formed around the mixer which were difficult to be removed in a large scale. One technique was to add the sulfonated PEEK in droplet form using a buret. Another speedy technique was to use a mixing pipe where a continuous high pressure ice water flowed through one side of the pipe, and a continuous sulfonated PEEK flowed through another side of the pipe during which air was used to shoot the sulfonated PEEK into the mixing pipe. The sulfonated PEEK turned to solid when it directly contacted with the ice water. This clogged and disrupted the flow and generated hydrogen sulfide. The solid materials were removed by an auger.

The polymer was washed to remove acid residuals. As the polymer was being washed, the acid molecules were replaced by water molecules. The particle size became larger as the washing time increased.

The polymer was then dried by convection for 24 hours to remove residual water. The solid material was clear brown yellow.

The foregoing description of specific embodiments and examples of the invention have been presented for the purpose of illustration and description, they are not intended to be exhaustive or to limit the invention to the precise forms disclosed. Obviously many modifications, embodiments, and variations are possible in light of the above teaching. It is intended that the scope of the invention encompass the generic area as herein disclosed, and by the claims appended hereto and their equivalents.

What is claimed is:

1. An acid-base proton conducting polymer blend membrane, comprising:
    a first polymer having acidic subunits; and
    a second polymer having basic subunits;
    wherein at least one of said first and second polymers further comprises at least one functional unit selected from the group consisting of hydrophilic units, methanol blocking units, dimension stabilizer units and flexible units,
    wherein said hydrophilic unit is selected from the group consisting of polyvinylpyrrolidone, poly(n-isopropylacrylamide), poly(2-hydroxy-ethyl methacrylates), copolymers of (vinylpyrrolidone-vinylimidazole), copolymers of (vinylpyrrolidone-dimethylaminoethyl methacrylate), copolymers of (vinylpyrrolidone-stryene), copolymers of (vinylpyrrolidone-vinylacetate), copolymers of (vinylpyrrolidone-vinylacetate-vinyl alcohol), and copolymers of (acrylonitrile-isopropylacrylamide)
    wherein said methanol blocking units is selected from the group consisting of copolymers of (vinylpyrrolidone-vinylacetate), copolymers of (vinylpyrrolidone-vinylacetate-vinyl alcohol), polyvinylalcohol, polyvinylacetate, copolymers of vinylacetate-vinylalcohol, copolymers of ethylene-vinylacetate, copolymers of vinylpyridine-vinylacetate, copolymers of vinylpyridine-vinylalcohol, and copolymers of vinylpyridine-vinylacetate-vinylalcohol
    wherein said dimension stabilizer unit comprises a polymer or copolymer comprising a hydrophobic unit selected from the group consisting of polystyrene, polysiloxane, and polyvinyldine fluoride, and
    wherein said flexible unit comprises vinylidene fluoride copolymer.

2. The acid-base proton conducting polymer blend membrane of claim 1 further comprising an interpenetrating network (IPN) polymers.

3. The acid-base proton conducting polymer blend membrane of claim 2 wherein said interpenetrating network (IPN) polymer is selected from the group consisting of UV initiated, e-beam initiated, gamma ray initiated, thermal initiated and chemical initiated IPN polymers.

4. The acid-base proton conducting polymer blend membrane of claim 3 wherein said UV initiated IPN polymer comprises polyvinyl cinnamate.

5. The acid-base proton conducting polymer blend membrane of claim 3 wherein said UV initiated IPN polymer comprises 0.5 to 30 percent by weight of the membrane.

6. The acid-base proton conducting polymer blend membrane of claim 3 wherein said chemical initiated IPN polymer is selected from the sol-gel product groups consisting of tetramethyl orthosilicate (TMOS), tetraethyl orthosilicate (TEOS), and combinations of aminopropyl terminated polydimethylsiloxane with TMOS and/or TEOS.

7. The acid-base proton conducting polymer blend membrane of claim 3 wherein said chemical initiated IPN polymer comprises 0.01 to 25 percent of the membrane.

8. The acid-base proton conducting polymer blend membrane of claim 1 further comprising an elastomeric polymer or copolymer.

9. The acid-base proton conducting polymer blend membrane of claim 8 wherein said elastomeric polymer is selected from the group consisting of polyacrylonitril (PAN), acrylonitrile copolymers, polyvinylidene fluoride, vinylidene fluoride copolymers, polysiloxanes, siloxane copolymers and polyphosphazenes.

10. The acid-base proton conducting polymer blend membrane of claim 1 wherein said acidic subunits of said first polymer are selected from the group consisting of sulfonic acid, phosphoric acid, and carboxylic acid groups.

11. The acid-base proton conducting polymer blend membrane of claim 10 wherein said acidic subunits of said first polymer are selected from the group consisting of sulfonated polyetherether ketone, sulfonated polyetherether sulfone, sulfonated polyetherimide, and polyethersulfone.

12. The acid-base proton conducting polymer blend membrane of claim 11 wherein said first polymer having acidic subunits are selected from the group consisting of sulfonated polyetherether ketone (SPEEK) having about from 50 to 200% sulfonation.

13. The acid-base proton conducting polymer blend membrane of claim 1 wherein said basic subunits of said second polymer are selected from the group consisting of aromatic amines, aliphatic amines, heterocyclic nitrogen containing groups, heterocyclic oxygen containing groups, and heterocyclic sulfur containing groups.

14. The acid-base proton conducting polymer blend membrane of claim 13 wherein said basic subunits second polymer is selected from the group consisting of polybenzimidazole (PBI), polyvinylimidazole (PVI), and polyvinylpyridine (PVP), copolymer of styrene-4-vinylpyridine, copolymer of acrylonitrile-4-vinylpyridine, and copolymer of styrene-4-vinylpyridine-acrylic acid.

15. An electrochemical device, comprising:
an anode;
a cathode; and
the acid-base proton conducting polymer blend membrane of claim 1.

16. The electrochemical device of claim 15 comprising a fuel cell.

* * * * *